Apr. 17, 1923.

J. P. BALL 1,452,335

STARTING DEVICE FOR TREATING LIQUIDS

Filed Feb. 27, 1922

INVENTOR.

John P. Ball.

Patented Apr. 17, 1923.

1,452,335

UNITED STATES PATENT OFFICE.

JOHN P. BALL, OF CHICAGO, ILLINOIS.

STARTING DEVICE FOR TREATING LIQUIDS.

Application filed February 27, 1922. Serial No. 539,577.

*To all whom it may concern:*

Be it known that I, JOHN P. BALL, a citizen of the United States, residing in Chicago, in the county of Cook and State of Illinois, have invented certain new and useful Improvements in a Starting Device for Treating Liquids, of which the following is a specification.

In the treatment of sewage and trade wastes, and in the separation of valuable liquids from pulp in the metallurgical processes, the use of a centrifugal acting machine, whether it be a separator, a pump, or a blower, is an essential member. The motion control of the centrifugal acting member often depends upon the relative density of the liquid contained.

It is then the object of my invention to provide improvements in the art of motion control as well to the process or method as to the apparatus.

Another object of my invention is to provide means whereby a collected body of sludge may be submitted to an intermittent action of centrifugal force, and acceleration given to the speed depending upon the density of the sludge contained. And still another object of my invention is to provide a self-starting apparatus for an electric motor by means of a hydrometer connected to a rheostat whereby electric power may be supplied and controlled and the motion of the motor be dependent upon the density or specific gravity of the liquid sludge.

In the intermittent sprinkling filter process, it is desirable to obtain a period of sprinkling action and a period of rest; in the mechanical process it is desirable to obtain a period of agitation or a period of centrifugal action and a period of rest.

These periods of action and rest depend in many cases upon the specific gravity of the sewage or wastes; the object of my invention therefore is to provide electro-magnetic means for operating fast and loose pulleys for starting and stopping the necessary separating machinery. The hydro-metric application of the electro-magnet being dependent upon the specific gravity of the sewage undergoing treatment. Apparatus of this kind is shown in my application for U. S. Patent, Serial No. 463,219, April 21st, 1921.

My invention provides improvements especially applicable to devices of this general character, and in its preferred form, it utilizes a hydrometer suspended in the sludge within the settling tank. The rise and fall of the hydrometer according to the specific gravity of the sludge may be made to operate a system of fine levers connected to a rheostat, whereby an electric current may be induced to operate an electro-magnet, and whereby certain machinery may be started or stopped by the operation of fast and loose pulleys attached to gear wheels.

My invention includes automatic means for adjusting the speed of the motive power when power is applied directly to a motor through the action of a hydrometer, depending upon the specific gravity of the material undergoing treatment.

The accompanying drawing, shows certain adaptations of my invention.

Figure 1:
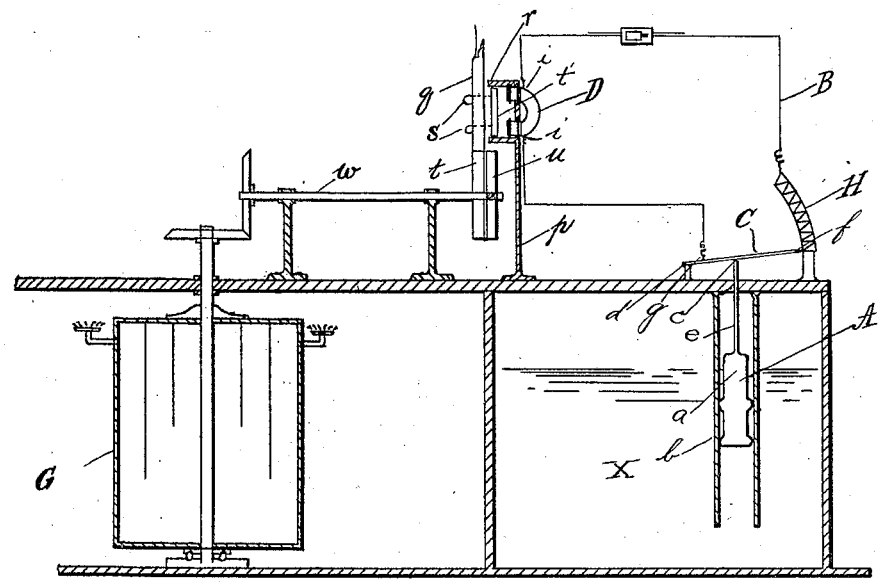
Figure 1 is a vertical, axial section showing the hydrometer suspended in a sedimentation tank, the electro-magnet operating a belt on fast and loose pulleys.

Referring to the drawings, A indicates a hydrometer, B an electric circuit, C a connecting circuit arm, D an electro-magnet, G a centrifugal machine as in Figure 1, H is a rheostat for regulating the strength of the electric current.

Figure 2:
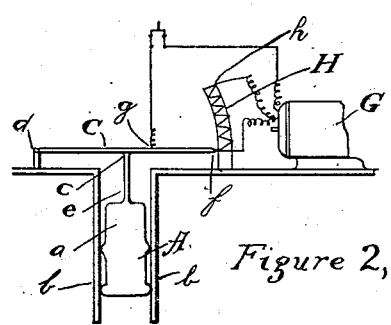
Figure 2 is a vertical axial section showing the details of a hydrometer acting with a rheostat whereby increased motion may be given to a driving motor for operating a centrifuge in connection with a plant for dewatering sludge.

G' is an electric motor in Figure 2.

Referring to Figure 1 with details as in Figure 2, I will now describe in detail the preferred form of my invention in the adaptation therein illustrated.

The hydrometer A is similar in shape to the usual instrument for determining the specific gravity of liquids, the float "$a$" being large enough to raise or lower the circuit arm C. A casing "$b$" surrounds the hydrometer as it rests in the liquid so as to guide the instrument in a vertical direction depending upon the specific gravity of the liquid.

The circuit arm C is preferably of delicate construction moving about the fulcrum "$d$" and sensitive enough to receive motion from the hydrometer by means of the standard "$e$" and hinged at "$c$." It will be seen from the drawing in Figure 2, that the point "$f$" in the circuit arm, moves in a multiple distance depending upon the lever C.

One branch of the electric circuit is connected to the circuit arm C at "*g*" and insulated in such a way as to give electric current to the point "*f*."

The rheostat H is an instrument of the usual sort for regulating the strength of an electric current. Figure 2 shows it used in connection with the circuit arm C; while one branch of the electric current is connected with the circuit arm "*f*," the other branch of the electric current is connected with the leg of the rheostat as at "*h*." As the arm C raises through the rheostat H, an electric current is produced the strength of which depends upon the specific gravity of the liquid in which the hydrometer is immersed.

The electro-magnet D as in Fig. 1 is a horseshoe shaped bar of soft iron which may be magnetized by a current of electricity by an insulated wire wound around it, and is of sufficient size and strength to operate the steel plate "*t'*" as shown in detail in Fig. 1; the electric current entering the magnet coil at *ii*. There may be one or more electro-magnets as desired to operate the necessary machinery.

The electric motor shown as G in Figure 1 may be used in this manner by receiving electric current through a rheostat for the operation of centrifugal and agitating machinery in the purification of sewage. It is desired in this way to regulate the speed of the centrifugal depending upon the specific gravity of the sludge, as shown in my application for U. S. Patent, Serial No. 463,219, April 21, 1921, and also in my application No. 479,741, entitled " Sewage purifiers."

A further object of my invention is to start in motion revolving machinery by means of changing a belt from a loose to a fast pulley; this being done by a magnet grip as shown in Figure 1. Here the magnet D is set up as shown supported on a bracket "*p*" and facing the belt "*q*." The steel plate "*t'*" which is attracted by the electro-magnet D, is provided with grips S. S. in contact with the belt "*q*": "*t*" represents a loose pulley and *u* represents a fast pulley supported on the shaft "*w*."

In operation, as the magnet power is applied the steel plate is attracted towards the magnet and carries with it the belt "*q*" shifting the belt from the loose pulley to the fast pulley and thus starting the machinery. This operation depends upon the hydrometer attachment as described in previous paragraphs and depending upon the specific gravity of the sludge in tank as shown at X.

I claim as my invention:

1. The herein described method which consists in subjecting sewage sludge to an intermittent action of centrifugal force and acceleration given to the speed, depending on the density of the sludge contained.

2. The combination with a tank for treating sewage of a hydrometer suspended at the standard level of the sewage within said tank, an electric magnet operated by an electric current for setting in motion the machinery by means of changing the belting from a fast to a loose pulley.

3. The combination with an apparatus for treating sewage of an electric magnet operated by an electric current, means for transposing a power belt on a fast and loose pulley, means for creating an intermittent period of action and rest within said apparatus.

4. In a mechanical sewage purifier, a self starting appliance of the class described, the combination with a settling basin provided with an independent centrifugal acting member of an electric magnet operated by an electric current contact, a rheostat located on said electric current, said rheostat being controlled and regulated by a standard connection with a hydrometer supported by the specific gravity of the sewage within said settling basin, means for starting in motion said centrifugal member, means for accelerating the speed of said centrifugal member, and means for stopping the motion of said centrifugal sprinkler depending upon the specific gravity of the sewage within said settling basin.

5. In a sewage purifier, the combination of a settling basin, an independent centrifugal acting member, means for driving said centrifugal acting member, a hydrometer supported by the buoyancy of the liquid within said basin, a casing surrounding said hydrometer and having free communication with said basin, a standard rod hinged at one end to a connecting current arm and at the other end attached to said hydrometer and arranged so as to operate a rheostat whereby electric current may be applied and regulated for starting and stopping said driving means.

JOHN P. BALL.

Witnesses:
R. M. Bell,
Calvin Schweppenheiser.